US008903180B2

(12) United States Patent
Madruga et al.

(10) Patent No.: US 8,903,180 B2
(45) Date of Patent: *Dec. 2, 2014

(54) SECURITY SCREENING IMAGE ANALYSIS SIMPLIFICATION THROUGH OBJECT PATTERN IDENTIFICATION

(75) Inventors: Joaquin Madruga, Round Rock, TX (US); Barry L. Minor, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/611,191

(22) Filed: Sep. 12, 2012

(65) Prior Publication Data

US 2013/0003135 A1   Jan. 3, 2013

Related U.S. Application Data

(63) Continuation of application No. 12/346,382, filed on Dec. 30, 2008, now Pat. No. 8,401,309.

(51) Int. Cl.
*G06K 9/62* (2006.01)
*G01V 5/00* (2006.01)

(52) U.S. Cl.
CPC .................................... *G01V 5/0008* (2013.01)
USPC ....................................................... 382/209

(58) Field of Classification Search
USPC ................................................ 382/209, 218
See application file for complete search history.

(56) References Cited

U.S. PATENT DOCUMENTS

| 5,600,303 | A | 2/1997 | Husseiny et al. |
| 7,286,634 | B2 | 10/2007 | Sommer, Jr. et al. |
| 2005/0111618 | A1 | 5/2005 | Sommer, Jr. et al. |
| 2006/0098773 | A1 | 5/2006 | Peschmann |
| 2006/0257005 | A1 | 11/2006 | Bergeron et al. |
| 2006/0273257 | A1 | 12/2006 | Roos et al. |
| 2007/0058037 | A1 | 3/2007 | Bergeron et al. |
| 2008/0062262 | A1 | 3/2008 | Perron et al. |
| 2008/0106405 | A1 | 5/2008 | Zanovitch |

FOREIGN PATENT DOCUMENTS

| WO | WO 2006/007723 A1 | 1/2006 |
| WO | WO 2008/034232 A1 | 3/2008 |

OTHER PUBLICATIONS

International Search Report and Written Opinion dated May 4, 2010 for International Application No. PCT/EP2009/065017, 11 pages.
U.S. Appl. No. 12/346,382.

*Primary Examiner* — John Strege
(74) *Attorney, Agent, or Firm* — Stephen R. Tkacs; Stephen J. Walder, Jr.; Thomas E. Tyson (57) ABSTRACT

A mechanism is provided for security screening image analysis simplification through object pattern identification. Popular consumer electronics and other items are scanned in a control system, which creates an electronic signature for each known object. The system may reduce the signature to a hash value and place each signature for each known object in a "known good" storage set. For example, popular mobile phones, laptop computers, digital cameras, and the like may be scanned for the known good signature database. At the time of scan, such as at an airport, objects in a bag may be rotated to a common axis alignment and transformed to the same signature or hash value to match against the known good signature database. If an item matches, the scanning system marks it as a known safe object.

20 Claims, 8 Drawing Sheets

SECURITY SCREENING IMAGE ANALYSIS SIMPLIFICATION THROUGH OBJECT PATTERN IDENTIFICATION

BACKGROUND

The present application relates generally to an improved data processing apparatus and method and more specifically to an apparatus and method for security screening image analysis simplification through object pattern identification.

Operators of X-ray scanners are faced with the difficult problem of identifying threats and ignoring mundane items. Carry-on bags are typically littered with many consumer electronics that add to the visual clutter in an X-ray image and may mask true threats or cause false positives. They also cause mental fatigue in the operators who are typically limited to fifteen minutes of viewing shift.

Current scanners may perform X-ray scans in three dimensions. Scanners may also color code materials. For example, a scanner may assign different colors for organic materials, plastics, metals, etc.

The goal of a security organization is to scan thousands of bags an hour with low false positives and 100% identification of threats. Currently, threat objects are partially automatically identified by fuzzy logic pattern matching, where a number of bags are placed through the system. The scanning system is trained to recognize likely patterns of groupings of objects, because threats may be disassembled in the bag or may be spread across a plurality of bags across a period of time.

SUMMARY

In one illustrative embodiment, a method, in a data processing system, is provided for security screening image analysis simplification through object pattern identification. The method comprises scanning an object to form an electronic representation of the scanned object, generating an electronic signature of the scanned object, reducing the electronic signature to a hash value for the scanned object, comparing the hash value for the scanned object against a set of hash values for known safe objects, and responsive to the hash value for the scanned object matching a hash value for a known safe object, marking the scanned object as safe.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for security screening image analysis simplification through object pattern identification. Popular consumer electronics and other items are scanned in a control system, which creates an electronic signature for each known object. The system may reduce the signature to a hash value and place each signature for each known object in a "known good" storage set. For example, popular mobile phones, laptop computers, digital cameras, and the like may be scanned for the known good signature database. At the time of scan, such as at an airport, objects in a bag may be rotated to a common axis alignment and transformed to the same signature or hash value to match against the known good signature database. If an item matches, the scanning system marks it as a known safe object.

The system may include two or more stages, where a limited number of popular objects may be cached on a first scan machine, and a more extensive set may be stored on a second scan machine, where the operator may take more time for identification. Cluttered bags with low confidence or positive threat object recognition may be automatically or manually directed from the first scan machine to an operator at the second scan machine. Less cluttered bags with positive identification of known good items may pass through rapidly.

Figure 1:
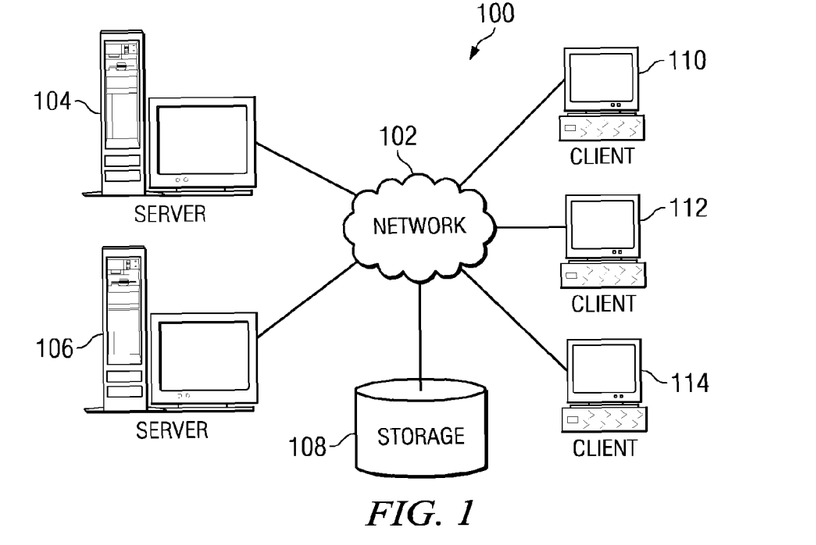
FIG. 1 depicts a pictorial representation of an example distributed data processing system in which aspects of the illustrative embodiments may be implemented.
Figure 2:
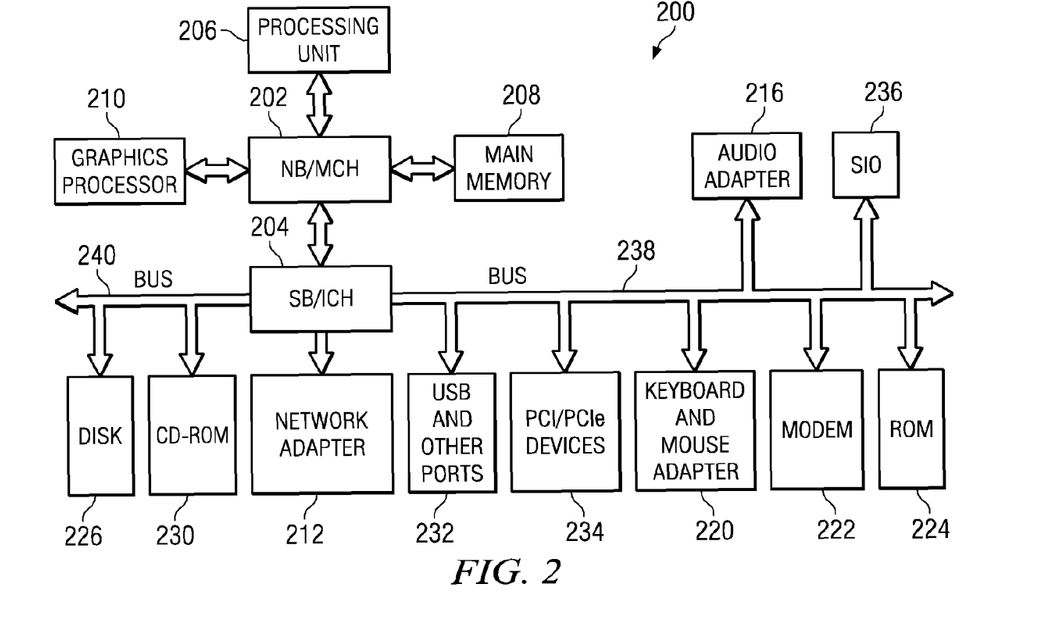
FIG. 2 is a block diagram of an example data processing system in which aspects of the illustrative embodiments may be implemented.
Figure 3:
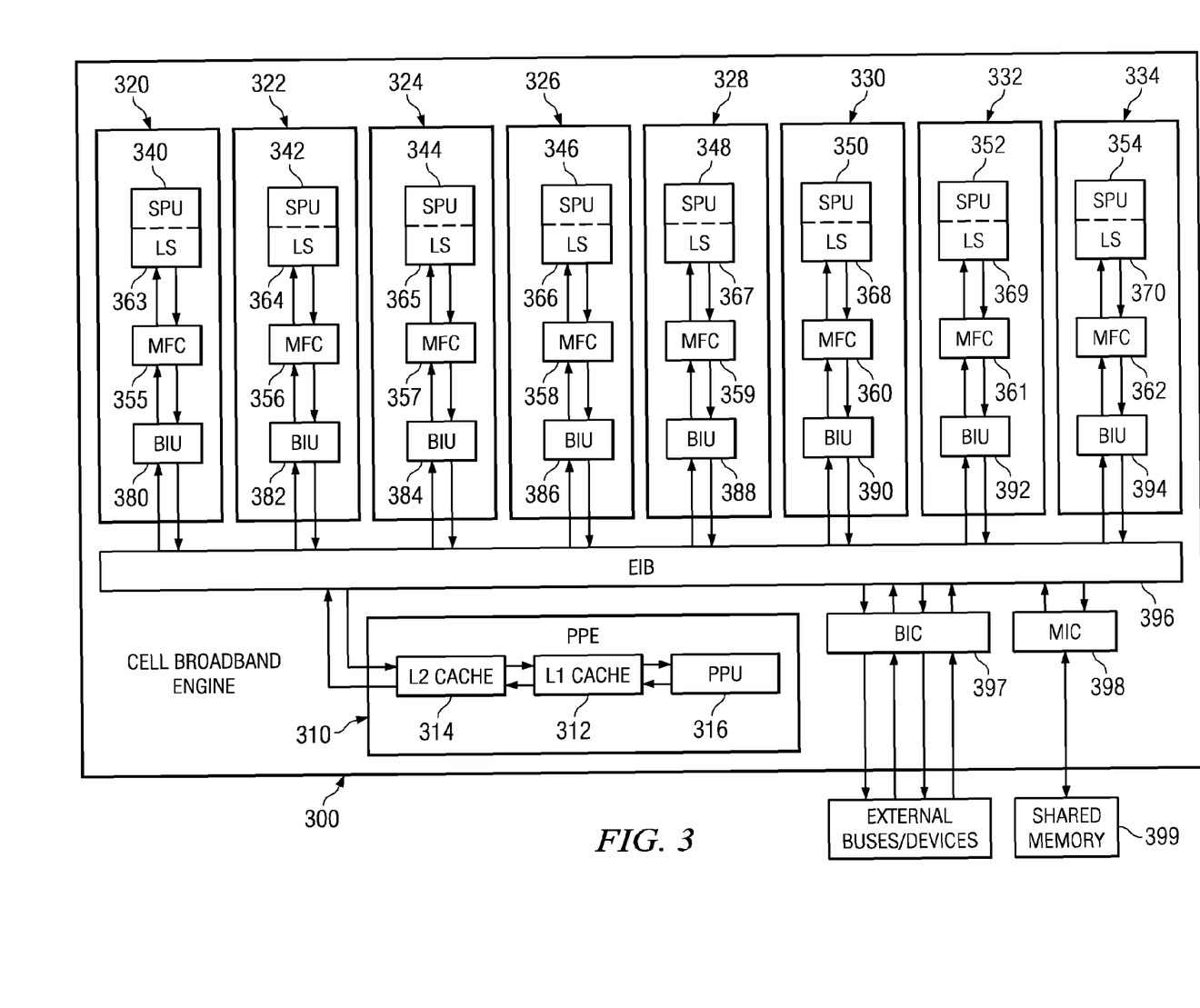
FIG. 3 is an exemplary block diagram of a data processing system in which aspects of the present invention may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1-3 are provided hereafter as example environments in which aspects of the illustrative embodiments may be implemented. While the description following FIGS. 1-3 will focus primarily on a single data processing device implementation, this is only an example and is not intended to state or imply any limitation with regard to the features of the present invention. To the contrary, the illustrative embodiments are intended to include distributed data processing environments and embodiments.

With reference now to the figures and in particular with reference to FIGS. 1-3, example diagrams of data processing environments are provided in which illustrative embodiments of the present invention may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

The distributed data processing system illustrated in FIG. 1 may be a security X-ray scanning system in accordance with an illustrative embodiment. Servers 104, 106 may provide access to storage 108 which is a centralized storage for known threat signatures and known good object signatures. Clients 110-114 may be X-ray scanner operator terminals. Clients 110-114 may retrieve object signatures from storage 108 via servers 104, 106, or may access signatures at storage 108.

With reference now to FIG. 2, a block diagram of an example data processing system is shown in which aspects of the illustrative embodiments may be implemented. Data processing system 200 is an example of a computer, such as server 104 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

FIG. 3 is an exemplary block diagram of a data processing system in which aspects of the present invention may be implemented. The exemplary data processing system shown in FIG. 3 is an example of the Cell Broadband Engine™ (Cell/B.E.™) data processing system, CELL BROADBAND ENGINE and CELL/B.E. are trademarks of Sony Computer Entertainment, Inc., in the United States, other countries, or both. Cell/B.E.™ data processing system 300 may be used in an X-ray scanner operator terminal, such as shown as clients 110-114 in FIG. 1, for example. While the Cell/B.E.™ data processing system will be used in the description of the preferred embodiments of the present invention, the present invention is not limited to such, as will be readily apparent to those of ordinary skill in the art upon reading the following description.

As shown in FIG. 3, the Cell/B.E.™ data processing system 300 includes a power processor element (PPE) 310 having a processor (PPU) 316 and its L1 and L2 caches 312 and 314, and multiple synergistic processor elements (SPEs) 320-334 that each has its own synergistic processor unit (SPU) 340-354, memory flow control 355-362, local memory or store (LS) 363-370, and bus interface unit (BIU unit) 380-394 which may be, for example, a combination direct memory access (DMA), memory management unit (MMU), and bus interface unit. A high bandwidth internal element interconnect bus (EIB) 396, a bus interface controller (BIC) 397, and a memory interface controller (MIC) 398 are also provided.

The local memory or local store (LS) 363-370 is a non-coherent addressable portion of a large memory map which, physically, may be provided as small memories coupled to the SPUs 340-354. The local stores 363-370 may be mapped to different address spaces. These address regions are continuous in a non-aliased configuration. A local store 363-370 is associated with its corresponding SPU 340-354 and SPE 320-334 by its address location, such as via the SPU Identification Register, described in greater detail hereafter. Any resource in the system has the ability to read/write from/to the local store 363-370 as long as the local store is not placed in a secure mode of operation, in which case only its associated SPU may access the local store 363-370 or a designated secured portion of the local store 363-370.

The Cell/B.E.™ data processing system 300 may be a system-on-a-chip such that each of the elements depicted in FIG. 3 may be provided on a single microprocessor chip. Moreover, the Cell/B.E.™ data processing system 300 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 320-334 are coupled to each other and to the L2 cache 314 via the EIB 396. In addition, the SPEs 320-334 are coupled to MIC 398 and BIC 397 via the EIB 396. The MIC 398 provides a communication interface to shared memory 399. The BIC 397 provides a communication interface between the CBE 300 and other external buses and devices.

The PPE 310 is a dual threaded PPE 310. The combination of this dual threaded PPE 310 and the eight SPEs 320-334 makes the CBE 300 capable of handling 10 simultaneous threads and over 128 outstanding memory requests. The PPE 310 acts as a controller for the other eight SPEs 320-334 which handle most of the computational workload. The PPE 310 may be used to run conventional operating systems while the SPEs 320-334 perform vectorized floating point code execution, for example.

The SPEs 320-334 comprise a synergistic processing unit (SPU) 340-354, memory flow control units 355-362, local memory or store 363-370, and an interface unit 380-394. The local memory or store 363-370, in one exemplary embodiment, comprises a 256 KB instruction and data memory which is visible to the PPE 310 and can be addressed directly by software.

The PPE 310 may load the SPEs 320-334 with small programs or threads, chaining the SPEs together to handle each step in a complex operation. For example, a set-top box incorporating the Cell/B.E.™ data processing system 300 may load programs for reading a DVD, video and audio decoding, and display, and the data would be passed off from SPE to SPE until it finally ended up on the output display. At 4 GHz, each SPE 320-334 gives a theoretical 32 GFLOPS of performance with the PPE 110 having a similar level of performance.

The memory flow control units (MFCs) 355-362 serve as an interface for an SPU to the rest of the system and other elements. The MFCs 355-362 provide the primary mechanism for data transfer, protection, and synchronization between main storage and the local storages 363-370. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3 without departing from the spirit and scope of the present invention.

Figure 4:
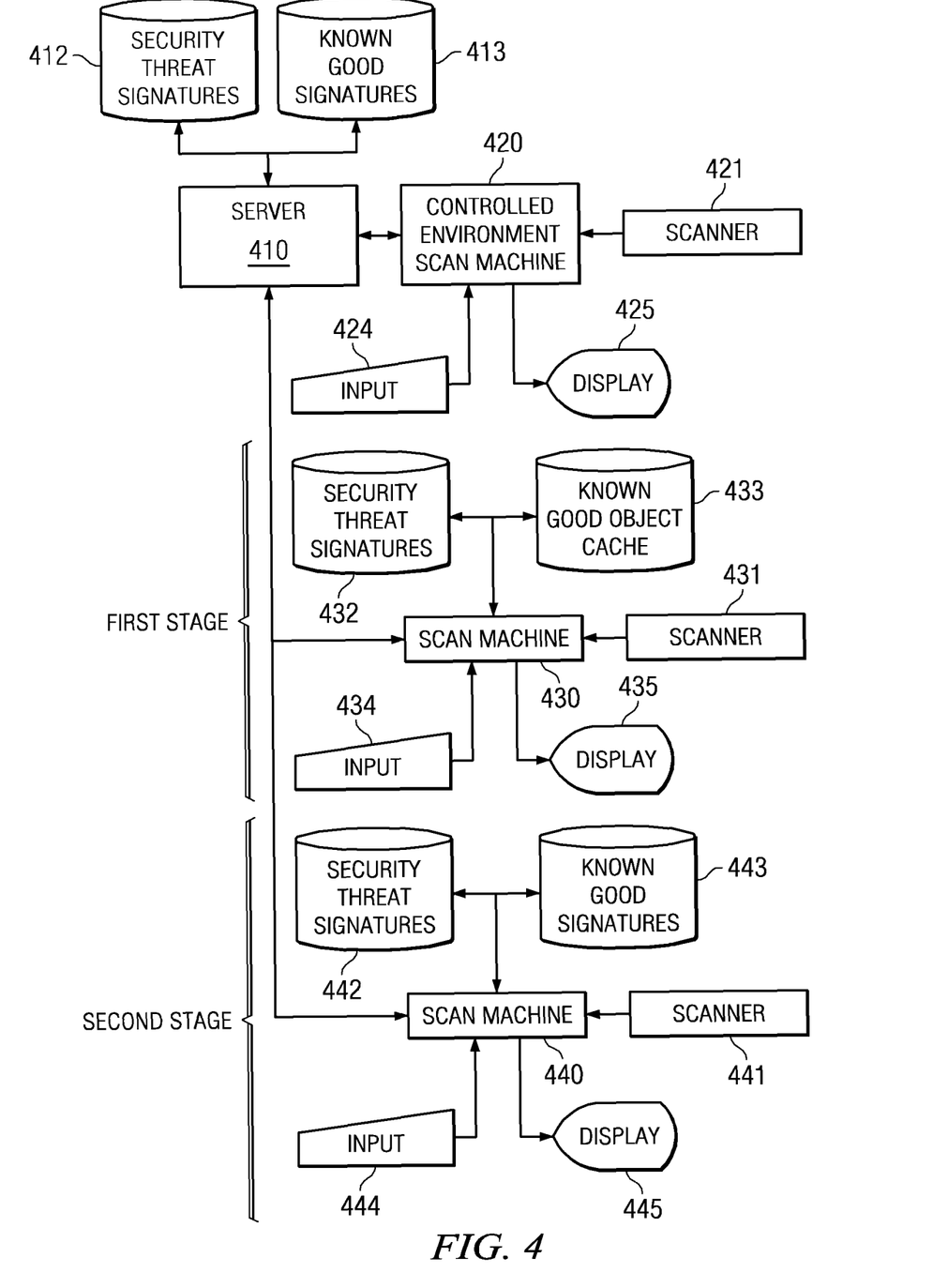
FIG. 4 is a block diagram illustrating a security X-ray scanning system in accordance with an illustrative embodiment.

FIG. 4 is a block diagram illustrating a security X-ray scanning system in accordance with an illustrative embodiment. Server 410 provides access to security threat signatures database 412 and known good object signatures 413. Controlled environment scan machine 420 is connected to scanner 421. Popular consumer electronics, and other items, may be scanned using scanner 421. Controlled environment scan machine 420 may create an electronic signature for each popular consumer item. An operator may view the X-ray scan of the item on display 425, manipulate the image using input device 424, and interact with a user interface to create the electronic signature of the object. Controlled environment scan machine 420 provides the electronic signatures of the popular consumer items to server 410 to be stored in known good object signatures database 413.

As an example, a popular mobile phone, laptop computer, or digital camera may be included in the database of known good consumer items. For instance, an item may be included if 10 million units are sold. The signatures may be reduced to a hash value and placed into the "known good" storage set and made available to scan machine 430 and scan machine 440.

During a live scan, such as at a security checkpoint at an airport, objects in a bag are scanned using scanner 431 of scan machine 430, which is connected to a database of security threat signatures 432 and a known good object cache 433. An operator of scan machine 430 may view the scan on display 435 and may manipulate the object by interacting with a user interface using input device 434. Objects may be rotated to a common axis alignment similar to the process used in medical positron emission tomography (PET) scans performed over time for a patient. Computer enhanced alignment in three-dimensional space is sometimes referred to as image registration. Scan machine 430 may then convert the X-ray scans of the objects to digital signatures and reduce the signatures to hash values.

Scan machine 430 may then compare the hash values to values in security threat signatures 432. Scan machine 430 may automatically identify threat objects partially using fuzzy logic pattern matching, where a number of bags are placed through the system. Scan machine 430 may be trained to recognize likely patterns of groupings of objects, because threats may be disassembled in the bag or may be spread across a plurality of bags across a period of time. If a given object matches the security threat signatures 432, scan machine 430 marks the object as a threat.

In accordance with the illustrative embodiment, scan machine 430 compares signatures to known good object cache 433. If an object matches the known good object cache 433, scan machine 430 marks the object as identified and trusted. Scan machine 430 may mark the object by coloring the object on the display or drawing a box around the object on display 435. Alternatively, or in addition, scan machine 430 may provide a list of the identified and trusted objects on the side of the display 435. Optionally, scan machine 430 may assign a confidence level to an object individually or to the bag as a whole.

Scan machine 430 may not identity an object as a 100% match of the pre-stored signature or hash because of modification to the object, such as adding an optical drive to a laptop, for example. Scan machine 430 may also fail to identify an object as a 100% match because of noise in the system or scan anomalies, such as a conveyor running at the wrong speed, which elongates the scan of the object. Furthermore, adjacent objects may distort or obfuscate the gathered data. Other factors may prevent scan machine 430 from identifying a known safe object as a 100% match. In this case, scan machine 430 may not mark the object as safe or may assign a low confidence level to the object. The operator may be able to correct many of these factors with additional processing using input device 434 and display 435.

In one embodiment, a two-stage process is used. In this embodiment, known good object cache 433 stores signatures for a limited number of very popular consumer items. Scan machine 430 may have a 15 minute window of examination. If all of the objects in a bag are known good items based on comparison with known good object cache 433, and none of the objects in the bag are recognized security threats based on comparison with security threat signatures 432, then the bag may be marked as safe and passed through in a shorter time window. However, cluttered bags with low confidence or positive object recognition are automatically or manually directed to a second stage.

In the second stage, objects in a bag are scanned using scanner 441 at scan machine 440, which is connected to a database of security threat signatures 442 and a database of known good signatures 443. An operator of scan machine 440 may view the scan on display 445 and may manipulate the object by interacting with a user interface using input device 444. Sean machine 440 may then convert the X-ray scans of the objects to digital signatures and reduce the signatures to hash values.

Scan machine 440 may then compare the hash values to values in security threat signatures 442. If a given object matches the security threat signatures 442, scan machine 440 marks the object as a threat. In accordance with the illustrative embodiment, scan machine 440 compares signatures to known good signatures 443. If an object matches a known good object signature 443, scan machine 440 marks the object as identified and trusted. The operator in the second stage at scan machine 440 may spend more time reviewing bags with low confidence levels, unknown objects, or suspected security threats.

The security system illustrated in FIG. 4 reduces the overall time for security check via an odds game. If 100 million consumer devices of a particular type exist, and 1% of them pass through the security system on a given day, then 1 million objects are being viewed and inspected, which wears on the operator. Even though some objects may be too close to other objects or the machine may not be accurately calibrated, if 20% to 50% can be automatically identified as safe, then the workload on the operator can be reduced significantly. This naturally increases as objects are added to the "known good" database 413, which is passed onto known good object cache 433 and known good object cache 443.

FIGS. 5A-5D depict example X-ray scan displays in accordance with an illustrative embodiment. More particularly, with reference to FIG. 5A, display window 500 includes a scan display portion 510, which shows the X-ray scan of a bag, for example. The scan machine may identity objects within the scan, generate a signature for the objects, and reduce the signature to a hash. The scan machine may then compare the bash values for the objects in scan display portion 510 with a known good signature storage set. Known good display portion 520 lists a set of identified known good objects 522.

Figure 5A:
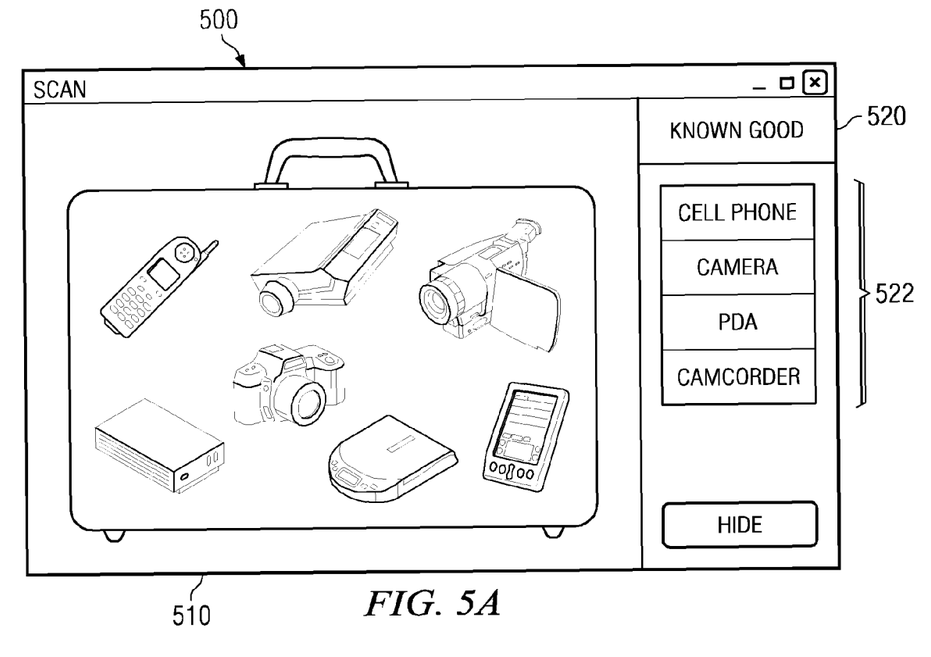
FIGS. 5A-5D depict example X-ray scan displays in accordance with an illustrative embodiment.
Figure 5B:
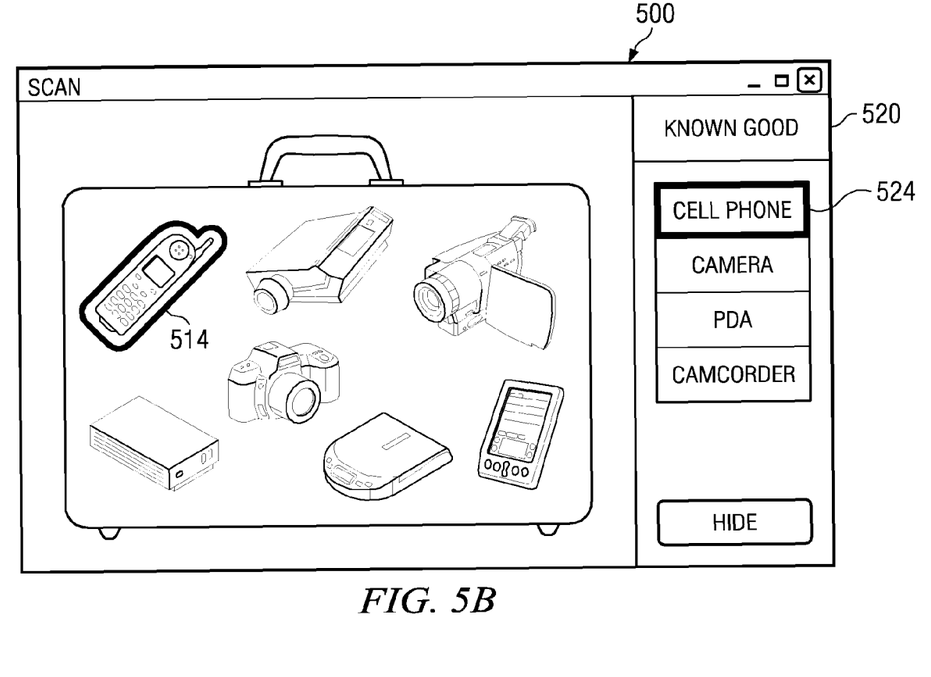
Figure 5C:
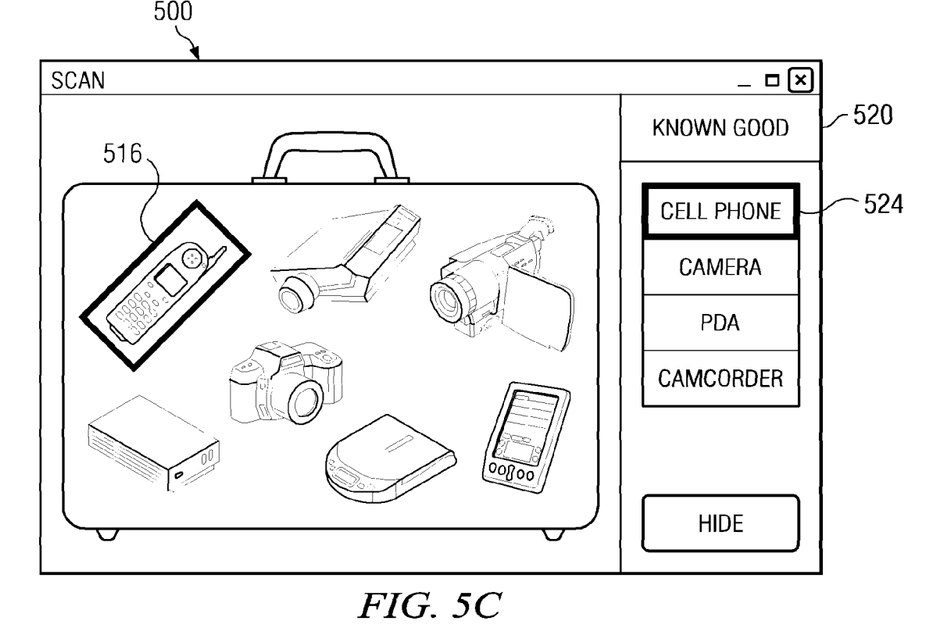

As shown in FIG. 5B, an operator may select a known good object, such as object 524 in known good display portion 520. The selected known good object is highlighted in scan display portion 510, as shown at 514. Object 514 may be highlighted using a color, graying out the object, or the like. As another example, as shown in FIG. 5C, an operator may select a known good object, such as object 524 in known good display portion 520, and the selected known good object may be highlighted in scan display portion 510 by outlining the object with a box 516.

Figure 5D:
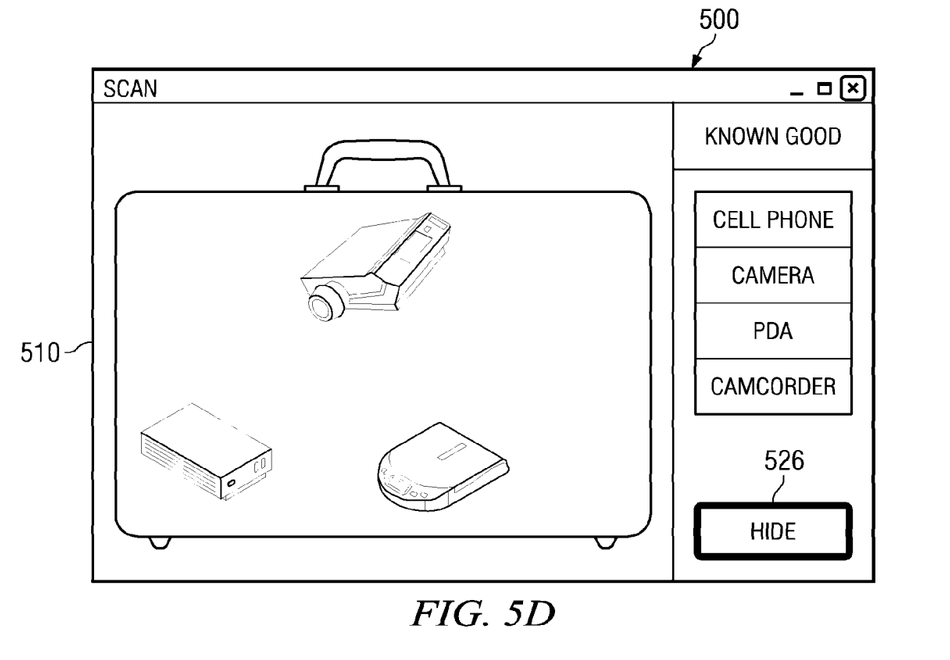

Once an object is known as safe, it is not helpful to the operator to render the object on the display. Removing the object from the display simplifies the viewing and identification task of the operator, reducing visual confusion and fatigue. Removing known good objects from the display also allows for better concentration on unidentified objects. As shown in FIG. 5D, if the operator selects "HIDE" button 526, the known good objects are removed from display portion 510.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
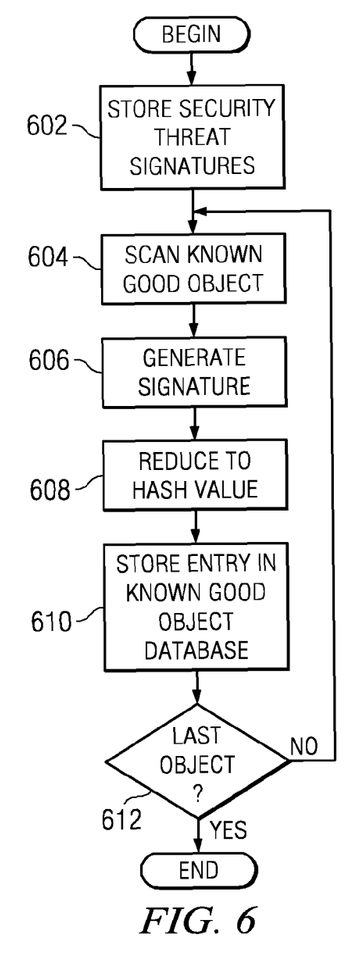
FIG. 6 provides a flowchart outlining example operations of a controlled environment scan process in accordance with an illustrative embodiment.

FIG. 6 provides a flowchart outlining example operations of a controlled environment scan process in accordance with an illustrative embodiment. Operation begins, and the operator stores security threat signatures (block 602). These security threat signatures identify known security threats that may be automatically identified using a scan machine. The operator then scans a known good object (block 604) in the controlled environment. The known good object may be a popular consumer item, such as a popular mobile phone or laptop computer, for example.

The controlled environment scan machine then generates an electronic signature of the scan of the known good object (block 606) and reduces the signature to a hash value (block 608). The scan machine then stores an entry in a known good object database (block 610). The entry may include a descriptive name, a manufacturer and model number, the hash value, and a value representing how common or popular the item is.

The controlled environment scan machine then determines whether the object is the last object to be scanned (block 612). This determination may be made by determining whether the operator closes out of the scan user interface or whether the operator selects to scan another object. If the operator wishes to scan another object, operation returns to block 604 to scan another known good object. Otherwise, if the object is the last object to be scanned in block 612, then operation ends.

Figure 7:
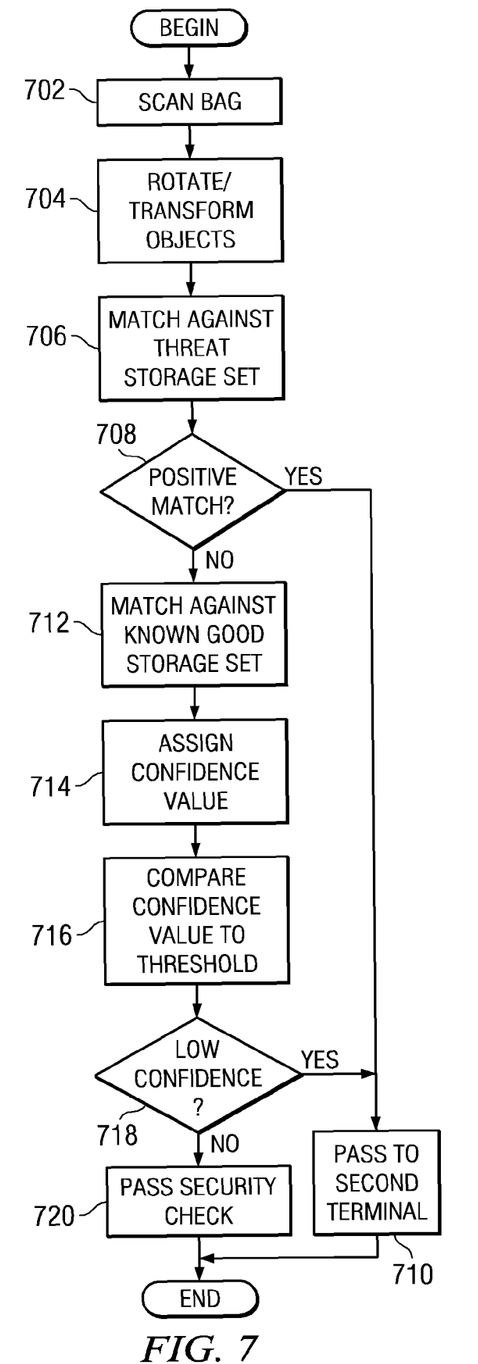
FIG. 7 provides a flowchart outlining example operations of a first stage scan process in accordance with an illustrative embodiment.

FIG. 7 provides a flowchart outlining example operations of a first stage scan process in accordance with an illustrative embodiment. Operation begins, and an operator scans a bag (block 702). The operator rotates and transforms objects in the scan (block 704) to form an electronic signature and/or hash value for the object. The scan machine matches the objects against a security threat storage set (block 706). The scan machine determines whether there is a positive match (block 708), meaning an object in the scan is identified as a security threat. In the depicted example, if there is a security threat in block 708, then the bag is passed to a second terminal (block 710) for closer inspection, and operation ends. Alternatively, if there is a match in block 708, the scan machine may continue to match objects in the scan to identify known good items.

If there is not a positive match in block 708, the scan machine matches objects in the scan against a known good storage set (block 712). The scan machine first generates an electronic signature for the object and reduces the signature to a hash value. The scan machine matches the object against the known good storage set by comparing the hash value to the hash values of known good, or safe, objects.

Thereafter, the scan machine assigns a confidence value (block 714) and compares the confidence value to a threshold (block 716). The scan machine then determines whether the bag has a low confidence (block 718). If the scan machine determines that the bag has a low confidence, then the bag is automatically or manually passed to a second terminal for further inspection, and operation ends. If the scan machine determines that the bag does not have a low confidence in block 718, then the bag passes the security check (block 720), and operation ends.

Figure 8:
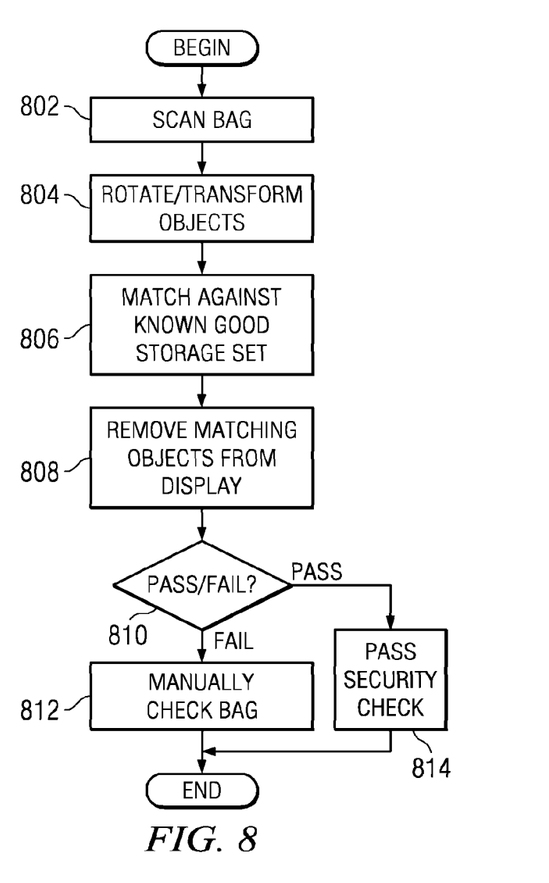
FIG. 8 provides a flowchart outlining example operations of a scan process with removal of known good objects in accordance with an illustrative embodiment.

FIG. 8 provides a flowchart outlining example operations of a scan process with removal of known good objects in accordance with an illustrative embodiment. Operation begins, and the operator scans a bag (block 802). The operator rotates and transforms objects in the scan (block 804) to form an electronic signature and/or hash value for the object. The scan machine matches the objects against a known good storage set (block 806). The scan machine first generates an electronic signature for the object and reduces the signature to a hash value. The scan machine matches the object against the known good storage set by comparing the hash value to the hash values of known good, or safe, objects.

The scan machine removes matching objects from the display (block 808) to simplify the viewing and identification task of the operator, reducing visual confusion and fatigue and allowing for better concentration on unidentified objects. The scan machine determines whether the bag passes or fails the security check (block 810). This determination may be made automatically by determining a confidence level or determining whether all objects are identified as safe. Alternatively, this determination may be made by an operator viewing and inspecting the scan. If the scan machine determines that the bag fails the check, the operator may manually check the bag (block 812), and operation ends. If the scan machine determines that the bag passes the security check in block 810, then the bag passes through the security check (block 814), aid operation ends.

Figure 9:
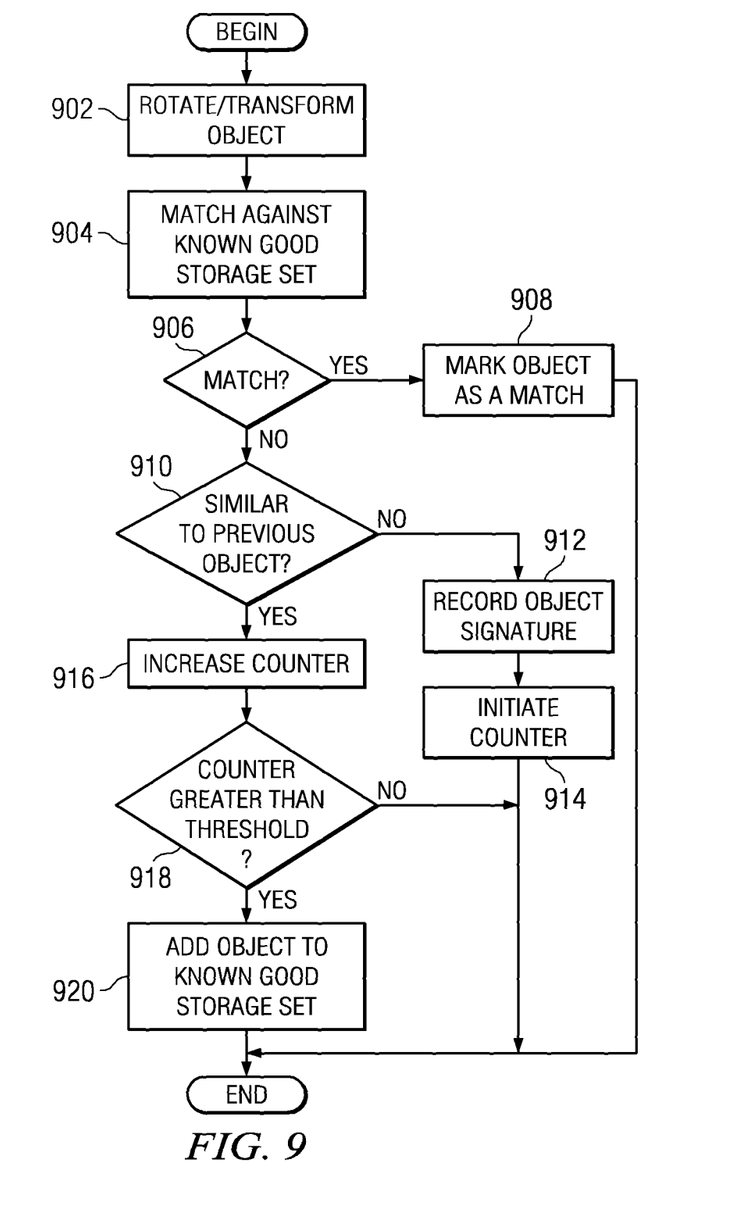
FIG. 9 provides a flowchart outlining example operations of a scan process with automatic addition of new items in accordance with an illustrative embodiment.

The process of identifying new safe objects may lag behind the adoption of new consumer devices. In addition to scanning consumer electronics and other consumer items in a control system, the security system may record images of candidate devices. If a threshold number of devices that are very similar pass through the security system, then one may assume that the device is a new consumer device. FIG. 9 provides a flowchart outlining example operations of a scan process with automatic addition of new items in accordance with an illustrative embodiment. Operation begins, and an operator rotates and transforms an object (block 902) to form an electronic signature and/or hash value for the object. The scan machine matches the object against a known good object storage set (block 904).

The scan machine determines whether the object matches an item in the known good object set (block 906). If the object matches a known good object, the scan machine marks the object as a match (block 908). Thereafter, operation ends.

If the object does not match a known good object in block 906, the scan machine determines whether the object is similar to a previous object (block 910). If the object is not similar to a previous object, the scan machine records the object signature (block 912), and initiates a counter associated with the object signature (block 914). Thereafter, operation ends.

If the scan machine determines that the object is similar to a previously scanned object in block 910, the scan machine increases the counter associated with the object signature (block 916). Then, the scan machine determines whether the counter is greater than a threshold (block 918). If the counter is not greater than the threshold, then operation ends. If the counter is greater than the threshold in block 918, then a significant number of the same object has passed through the security system, and the scan machine adds the object to the known good storage set (block 920). Thereafter, operation ends.

Figure 10:
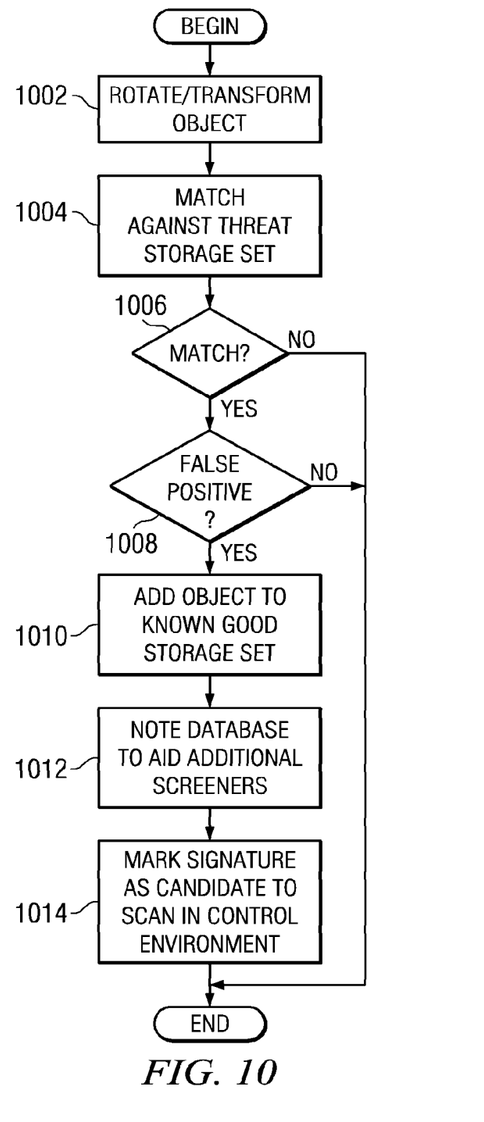
FIG. 10 provides a flowchart outlining example operations of a scan process for capturing false positives in accordance with an illustrative embodiment.

In addition to adding new items based on a threshold number of occurrences, the scan machine may leverage the fact that false positives are examined by human screeners. When an object is inspected due to it having a suspect signature, the screener may note what the object is in a database. This database may then be consulted later. FIG. 10 provides a flowchart outlining example operations of a scan process for capturing false positives in accordance with an illustrative embodiment. Operation begins, and an operator rotates and transforms an object (block 1002) to form an electronic signature and/or hash value for the object. The scan machine matches the object against a suspected security threat storage set (block 1004).

The scan machine then determines whether the object matches a suspected security threat (block 1006). If the object does not match, operation ends. If the object matches an item in the suspected security threat storage set in block 1006, then the scan system determines whether the match is a false positive (block 1008). This determination may be made by an operator and entered into the scan machine terminal. If the match is not a false positive, then operation ends, and the bag may be marked for manual inspection.

If the match is a false positive in block 1008, then the scan machine adds the object to a known good storage set (block 1010), notes a database to aid additional screeners when encountering the object (block 1032), and marks the signature as a candidate to scan in a controlled environment (block 1014). Thereafter, operation ends.

Thus, the illustrative embodiments provide mechanisms for security screening image analysis simplification through object pattern identification. Popular consumer electronics and other items are scanned in a control system, which creates an electronic signature for each known object. The system may reduce the signature to a hash value and place each signature for each known object in a "known good" storage set. For example, popular mobile phones, laptop computers, digital cameras, and the like may be scanned for the known good signature database. At the time of scan, such as at an airport, objects in a bag may be rotated to a common axis alignment and transformed to the same signature or hash value to match against the known good signature database. If an item matches, the scanning system marks it as a known safe object.

The system may include two or more stages, where a limited number of popular objects may be cached on a first scan machine, and a more extensive set may be stored on a second scan machine, where the operator may take more time for identification. Cluttered bags with low confidence or positive threat object recognition may be automatically or manually directed from the first scan machine to an operator at the second scan machine. Less cluttered bags with positive identification of known good items may pass through rapidly.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for security screening image analysis simplification through object pattern identification, the method comprising:
   scanning an object to form an electronic representation of the scanned object;
   generating an electronic signature of the scanned object;
   reducing the electronic signature to a hash value for the scanned object;
   comparing the hash value for the scanned object against a set of hash values for known safe objects;
   responsive to the hash value for the scanned object not matching a hash value for a known safe object, determining whether the scanned object is similar to a previously scanned object;
   responsive to the scanned object being similar to a previously scanned object, incrementing a counter associated with the previously scanned object; and
   responsive to the counter associated with the previously scanned object reaching a pedetermined threshold, adding the hash value for the scanned object to the set of hash values for known safe objects.

2. The method of claim 1, wherein marking the scanned object as safe comprises:
   highlighting the scanned object on a scan display.

3. The method of claim 1, further comprising:
   removing the scanned object from a scan display.

4. The method of claim 1, further comprising:
   responsive to the hash value for the scanned object matching a hash value for a known safe object, marking the scanned object as safe.

5. The method of claim 1, further comprising:
   responsive to the scanned object not being similar to a previously scanned object, recording the hash value for the scanned object and initiating a counter associated with the scanned object.

6. The method of claim 1, wherein scanning the object to form the electronic representation of the scanned object comprises:
   obtaining a three-dimensional representation of the scanned object; and
   performing processing on the three-dimensional representation of the scanned object.

7. The method of claim 6, wherein performing processing on the three-dimensional representation of the scanned object comprises:
   rotating the three-dimensional representation of the scanned object to a common axis alignment.

8. A computer program product comprising a non-transitory computer readable medium having a computer readable program recorded thereon, wherein the computer readable program, when executed on a computing device, causes the computing device to:
   scan an object to form an electronic representation of the scanned object;
   generate an electronic signature of the scanned object;
   reduce the electronic signature to a hash value for the scanned object;
   compare the hash value for the scanned object against a set of hash values for known safe objects;
   responsive to the hash value for the scanned object not matching a hash value for a known safe object, determine whether the scanned object is similar to a previously scanned object;
   responsive to the scanned object being similar to a previously scanned object, incerment a counter associated with the previously scanned object; and
   responsive to the counter associated with the previously scanned object reaching a predetermined threshold, add the hash value for the scanned object to the set of hash values for known safe objects.

9. The computer program product of claim 8, wherein the computer readable program further causes the computing device to:
   remove the scanned object from a scan display.

10. The computer program product of claim 8, wherein the computer readable program further causes the computing device to:
   responsive to the hash value for the scanned object matching a hash value for a known safe object, mark the scanned object as safe.

11. An apparatus, comprising:
a processor; and
a memory coupled to the processor, wherein the memory comprises instructions which, when executed by the processor, cause the processor to:
scan an object to form an electronic representation of the scanned object;
generate an electronic signature of the scanned object;
reduce the electronic signature to a hash value for the scanned object;
compare the hash value for the scanned object against a set of hash values for known safe objects; and
responsive to the hash value for the scanned object not matching a hash value for a known safe object, determine whether the scanned object is similar to a previously scanned object;
responsive to the scanned object being similar to a previously scanned object, increment counter associated with the previously scanned object; and
responsive to the counter associated with the previously scanned object reaching a predetermined threshold, add the hash value for the scanned object to the set of hash values for known safe objects.

12. The apparatus claim 11, wherein the instructions further cause the processor to:
remove the scanned object from as scan display.

13. The apparatus of claim 11, wherein the instructions further cause the processor to:
responsive to the hash value for the scanned object matching a hash value for a known safe object, mark the scanned object as safe.

14. The computer program product of claim 8, wherein the computer readable program further causes the computing device to:
responsive to the scanned object not being similar to a previously scanned object, record the bash value for the scanned object and initiating a counter associated with the scanned object.

15. The computer program product of claim 8, wherein scanning the object to form the electronic representation of the scanned object comprises:
obtaining, a three-dimensional representation of the scanned object; and
performing processing on the three-dimensional representation of the scanned object.

16. The computer program product of claim 15, wherein performing processing on the three-dimensional representation of the scanned object comprises:
rotating the thee-dimensional representation of the scanned object to a common axis alignment.

17. The apparatus of claim 11, wherein marking the scanned object as safe comprises:
highlighting the scanned object on a scan display.

18. The apparatus of claim 13, wherein the instructions cause the processor to:
responsive to the scanned object not being similar to a previously scanned object, recording the hash value for the scanned object and initiating a counter associated with the scanned object.

19. The apparatus of claim 11, wherein scanning the object to form the electronic representation of the scanned object comprises:
obtaining a three-dimensional representation of the scanned object; and
performing processing on the thee-dimensional representation of the scanned object.

20. The apparatus of claim 19, wherein performing processing on the three-dimensional representation of the scanned object comprises:
rotating the three-dimensional representation of the scanned object to a common axis alignment.

* * * * *